(12) United States Patent
Olding et al.

(10) Patent No.: US 6,736,997 B2
(45) Date of Patent: May 18, 2004

(54) SOL-GEL DERIVED RESISTIVE AND CONDUCTIVE COATING

(75) Inventors: Tim Olding, Sydenham (CA); Mark Barrow, Brampton (CA); David Barrow, Milton (CA)

(73) Assignee: Datec Coating Corporation (CA)

( * ) Notice: Subject to any disclaimer, the term of this patent is extended or adjusted under 35 U.S.C. 154(b) by 0 days.

(21) Appl. No.: 10/093,942

(22) Filed: Mar. 8, 2002

(65) Prior Publication Data

US 2002/0145134 A1 Oct. 10, 2002

Related U.S. Application Data

(60) Provisional application No. 60/274,218, filed on Mar. 9, 2001.

(51) Int. Cl.$^7$ .......................... H01B 1/00; B05D 3/02; B05D 5/02
(52) U.S. Cl. ................. 252/512; 252/502; 252/514; 106/1.13; 106/1.14; 106/5; 106/31.13; 427/380
(58) Field of Search .................. 252/502, 512, 252/514, 516, 518.1, 579.3, 579.32; 106/1.13, 1.14, 5, 31.13; 427/380, 376.1, 419.2, 419.7

(56) References Cited

U.S. PATENT DOCUMENTS

| | | | | |
|---|---|---|---|---|
| 5,585,136 A | * | 12/1996 | Barrow et al. | 427/2.24 |
| 5,856,379 A | * | 1/1999 | Shiratsuchi et al. | 523/209 |
| 5,998,525 A | * | 12/1999 | Wang et al. | 524/425 |
| 6,144,106 A | * | 11/2000 | Bearinger et al. | 257/789 |

FOREIGN PATENT DOCUMENTS

DE  19620645 A1 * 12/1996 ............ C09K/3/00

* cited by examiner

*Primary Examiner*—Yogendra N. Gupta
*Assistant Examiner*—Kallambella Vijayakumar
(74) *Attorney, Agent, or Firm*—Harness, Dickey & Pierce, P.L.C.

(57) ABSTRACT

A composition for application to a substrate to form a an electrically conductive coating thereon. The composition includes a sol-gel solution filled with a conductive powder. The coating may be conductive or resistive depending on the application. A process is provided for applying such a coating by mixing a sol-gel solution with up to about 90% by weight of the solution of a conductive powder selected from the group consisting of ceramics, inter-ceramics, semiconductors and metals so as to provide a uniform stable dispersion. The stable dispersion is applied to a substrate and the coated substrate is fired at a temperature sufficient to remove organic constituents and to produce at least a partially conductive film on the substrate. A heating device is also provided which is a product of the above process.

5 Claims, 1 Drawing Sheet

SOL-GEL DERIVED RESISTIVE AND CONDUCTIVE COATING

FIELD OF THE INVENTION

This invention relates to coatings for forming resistive or conductive thick films such as for resistance heating and electrode applications.

BACKGROUND OF THE INVENTION

The expressions "resistive" and "conductive" in association coatings are herein used to refer to coatings which will pass electrical currents as opposed to those which are insulative. Whether a coating is deemed resistive or conductive depends on how freely it passes an electrical current. The expression "electrically conductive coating" is intended to include both resistive and conductive coatings.

Previous thick film conductive and resistive coatings have been either epoxy-based or glass-based. The epoxy-based coatings generally included silver, nickel or carbon as a conductive material and in some instances chromium. A limitation to epoxy based coatings is that the epoxy (or other polymeric binder) is limited in temperature capability and therefore not suitable for many resistive element applications such as kettles or stove top elements. Typically the epoxy will degrade at a temperature of 200° C. or less.

Glass based conductive or resistive coatings employ an organic vehicle, a glass binder and a functional phase. The functional phase consists of metal particles such as silver, silver-palladium, copper or nickel, or semiconducting oxide particles such as ruthenium dioxide, bismuth ruthenate, lead ruthenate or bismuth iridate. Two significant technical limitations are encountered in using glass-based thick film resistor and conductor materials. Firstly, the films are typically deposited at a processing temperature in excess of 800° C. in order to process the film, precluding the use on substrate materials requiring lower temperatures. Glass frits with lower firing temperature are available, but typically contain a significant amount of lead which is undesirable in many applications due to its toxic properties. Secondly, the thermal expansion coefficient of the glass matrix must be similar to that of the substrate material in order to obtain sufficient film adhesion. Mismatched thermal expansion coefficients will result in spalling of the film upon initial cooling or in subsequent use.

In view of the limitations of processing temperature and matching of thermal expansion coefficients, some substrate materials such as aluminum are not feasible due to temperature limitations or lack of a compatible glass matrix. Additionally, this technology requires expensive semimetallic and metallic particle phase materials.

Another method of applying conductive and resistive coatings is through the chemical vapour deposition ("CVD") of thin film tin oxide-based resistive heating elements. This technology involves spraying a mist of stannic chloride onto the substrate when the substrate temperature is at 550° C. to produce thin layers of less than 1 micron in thickness. Resistive films produced by this technology are limited in the temperature of operation (at 350° C. the resistance increases), and in the substrates on which they can be deposited. The deposition temperature and the low thermal expansion coefficient ("CTE") of the resulting film limit the use of this technology to substrate materials with low CTE. It is not possible to deposit this layer on aluminum based substrates as thermal expansion differences eventually produce microcracks in the thin film. Another limitation of this technology is that it can only be deposited on materials with smooth surface morphologies.

One particular application has brought to light the shortcomings of state of the art resistive coatings for use as heating elements. The particular application relates to integrated heating elements for what are referred to as "hot top" glass based stoves. Current technology uses a resistive coil or heat lamp that is placed below the glass to provide the heat. Efforts to replace this design with an integrated heating design have proved unsuccessful. The glass is of a special composition having virtually zero thermal expansion and is not readily coated using glass based coatings because of processing temperatures and adhesion problems. Epoxy-based coatings are not a suitable alternative as they will not withstand the service requirements requiring temperatures of around 400° C.

Attempts have been made to use a CVD process to deposit a resistive element on the glass-ceramic. While the CVD resistive element has been deposited successfully on this material, the glass-ceramic becomes conductive at 400° C. and therefore, as such cannot meet the requirements of the European electrical safety standards for appliances (less than 100 mA at 3,750 V AC at operating temperature for 60 seconds). Accordingly a sol-gel composite insulating layer based on aluminum oxide or aluminum nitride has been provided between the glass and the resistive coating. However, the deposited layer typically has a surface roughness greater than the thickness of the CVD deposited coating which prevents the formation of a suitable resistive element from the CVD process.

It is an object of the present invention to provide a conductive or resistive coating which may be easily applied such as by being spray, dip, spin, brush or screen-print deposited without requiring vapour deposition techniques, which doesn't require high forming temperatures, and which can be produced to have desired thermal expansion properties.

It is a further object of the present invention to provide such a coating which may be effectively applied to a porous substrate and which is relatively insensitive to the shape of the substrate.

SUMMARY OF THE INVENTION

A composition is provided for application to a substrate to form an electrically conductive coating thereon. The composition includes a sol-gel solution in which up to about 90% of the solution is a mixture of conductive and insulative powders in a uniform stable dispersion. The conductive particles may be metallic, ceramic, inter-ceramic or semiconductors. The insulative particles may be metal oxide or ceramic.

The conductive particles may be at least one of a carbide, nitride, boride, silicide, oxide, graphite, molybdenum, tungsten, tantalum, nickel, chromium, silver, silver-palladium alloy, iron-nickel-chromium alloy, nickel chromium alloy, or iron-chromium-aluminum alloy. Preferably the conductive particles will have a particle size in the range of 1 to 100 microns but more preferably 2 to 20 microns.

A process is provided for producing a resistive or conductive coating on a substrate which comprises the steps of:
a. mixing a sol-gel solution with a conductive powder selected from the group consisting of ceramics, inter-ceramics, semi-conductors and metals so as to produce a uniform stable dispersion;
b. applying said stable dispersion to a substrate, so as to provide a coating thereon; and c. firing said coated substrate at a temperature sufficient to remove organic constituents and produce an at least partially conductive film on said substrate.

Steps b and c may be repeated as necessary to produce a stable coating of a desired thickness.

An insulative ceramic powder may be incorporated into the system to alter the resistance of the deposited layer. Possible candidates include but are not limited to aluminum oxide, silicon oxide, barium titanate, silicon carbide and iron oxide.

The sol-gel solution may be selected from the group including aluminates, silicates, titanates, zirconates or combinations thereof.

A heating device is provided which has a substrate of glass, metal or ceramic and a sol-gel derived resistive heating layer coated on a heated face of the substrate.

A heating device is further provided which has a contact member with a heating face opposite a heated face. An electrically insulative layer is bonded to the heating face and has an outer face distal the heated face. A sol-gel derived resistive heating layer is coated on the outer face of the electrically insulative layer. The sol-gel derived resistive heating layer may be in accordance with the compositions set out above and applied to the insulative layer according to the process also described above.

DESCRIPTION OF DRAWINGS

Preferred embodiments of the present invention will be described below with reference to the accompanying drawings in which.

DESCRIPTION OF PREFERRED EMBODIMENTS

Figure 1:
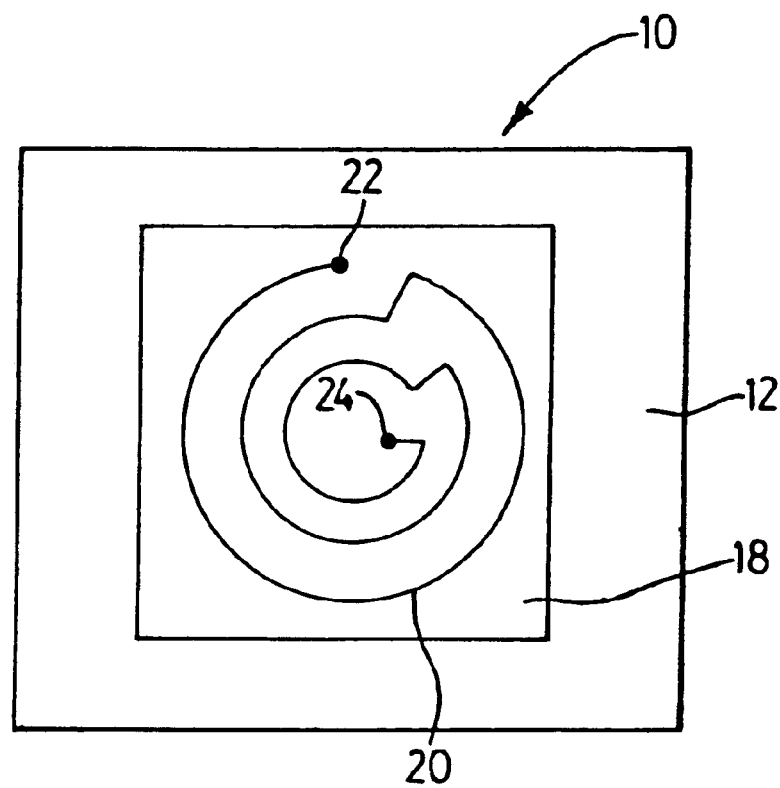
FIG. 1 is a bottom plan view of a heating device according to the present invention; and, FIG. 2 is a front elevation of the device of FIG. 1 showing the device in an inverted configuration.
Figure 2:
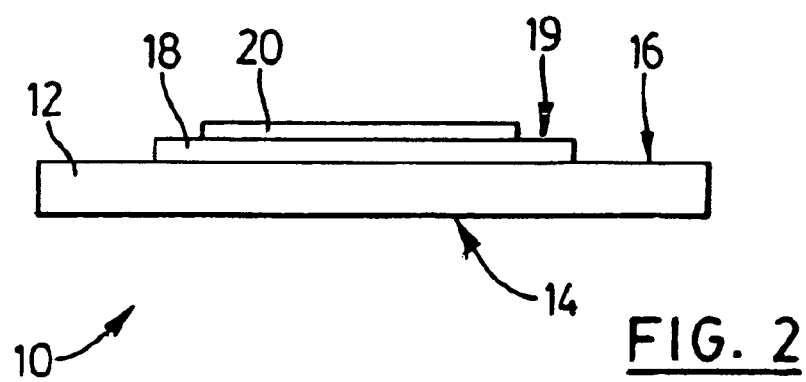

As disclosed in U.S. Pat. No. Re. 36,573, thick film ceramic coatings may be produced by loading conventional sol-gel solutions with up to about 90% by weight of finely divided ceramic particles. The resulting slurry or paint can be either spun or dip coated or sprayed or painted or screen printed onto a planar or non-planar substrate, then fired to remove the organic materials and to develop a microcrystalline structure.

According to the present invention, a sol-gel solution may be made suitable for producing thick resistive or conductive films by adding conductive powder to the sol gel.—The expressions "conductive powder" and "conductive particles" are intended to cover materials which conduct some electricity and would include conductive, semi-conductive and resistive powders. Insulative powders may also be added to the sol gel/conductive powder mixture to alter the resistance of the deposited coating.

The conductive powder is preferably one which is non-oxidizing at the temperatures used for the deposition or in service. Accordingly graphite may work in some requiring lower operating temperatures or that operate in a non-oxidizing environment.

The sol-gel solutions may be mixed with about 90% by weight of a conductive ceramic powder selected from the group consisting of oxides, carbides and nitrides so as to produce a uniform stable dispersion.

The conductive powder could conceivably be a ceramic, and inter-ceramic (such as a disilicide or a diboride), a semi-conductor (such as graphite) or a metal. Suitable results have been obtained with nickel and silver. It is expected that iron nickel chromium (or other) alloys may be suitable. Metals which are expected to produce suitable results include molybdenum, tungsten, tantalum, nickel, chromium, silver and silver palladium alloys, iron-nickel-chromium alloy, nickel chromium alloy and iron-chromium-aluminum alloy.

Typically the conductive powder will have a particular size on the order 20 microns however in some applications it may be desirable to have a particle size of up to 100 microns.

In some instances it may be desirable to vary the resistivity of the coating, for example to increase its resistance over the resistivity which would otherwise arise from the conductive powder filled sol-gel matrix. Combining insulative powders with the conductive powders will increase the resistivity while still providing a suitable coating.

It is expected that in most applications it will be desirable to have a finished coating which has a resistivity which does not diminish as the temperature increases to avoid associated control problems with an element that continues to increase in temperature despite a set power input. In any case, whether the resistance increases or diminishes with increasing temperature, it may still be desirable to modify the resistance temperature profile for particular applications. It may be possible to add ceramic powders to the basic sol-gel/conductive powder system to modify the resistance versus temperature profile. One candidate for such modification may be a ferroelectric material, such as barium titanate.

A coating made up of the ceramic and conductive powder filled sol-gel solution may be applied using conventional coating techniques such as spin or dip, spray or brush coating or screen printing, etc. and fired to remove any organic constituents of the sol-gel. This would typically require firing temperatures on the order of 300–400° C. However temperatures up to 800° C. maybe utilized depending on the application to produce a stable polycrystalline ceramic film containing the ceramic powder and the conductive powder on the substrate.

It has been found that a sol-gel derived resistive layer such as described above may be applied to a sol-gel derived aluminum oxide coating on a glass cook top without encountering problems resulting from the roughness of the aluminum oxide coating, as was typical when attempting to apply a resistive coating using chemical vapour deposition techniques. Other materials may be usable for the electrically insulating layer, for example aluminum nitride or silica.

A typical cook top is generally illustrated by reference 10 in FIG. 1. The cook top 10 has a contact member 12 having a heating face 14 opposite a heated face 16. The heating face 14 is that on which an item to be cooked will be placed and the heated face 16 is that to which heat would be applied by a resistive element 20. The material of the contact member would depend on the application but may for example be a glass or other ceramic or a metal.

An electrically insulative layer 18 is bonded to the heated face 16. The electrically insulative layer 18 has an outer face 19 distal the heated face 16.

A sol-gel derived resistive heating layer 20 of a composition such as described above applied according the above process is coated on the outer face 19 of the electrically insulative layer 18. Electrical terminals 22 and 24 may be provided for applying an electrical potential difference to opposite ends of the resistive heating layer 20.

It has been found that a thick film coating may be applied from sol-gel derived compositions of the type described above on a sol-gel aluminum oxide substrate to produce a serviceable resistive element with good adhesion capabilities and without problems associated with the surface roughness of the aluminum oxide layer.

Unlike chemical vapour deposition techniques, the coating of the present case is relatively insensitive to the geometry of the substrate being coated and easy to apply in a uniform thickness. In contrast, chemical vapour deposition tends to be relatively line of sight, requires a suitable atmosphere and uniform thickness is difficult to achieve.

The low firing temperature and ability to tailor the properties of the sol-gel matrix enables the use of relatively inexpensive, common resistance heating element materials. Standard iron-chromium and nickel-chromium alloys, silicon carbide, graphite and molybdenum disilicide are likely candidates for the conductive particle component but only form representative examples as other materials may also work.

Resistive or conductive sol-gel composite derived thick films as described above which combine a conductive phase in a sol-gel derived ceramic matrix provide enhanced performance over other thick film resistive technologies in terms of ease of deposition, range of deposition temperature and maximum operating temperature. Substrate materials that are incompatible with glass-based thick films can be used with sol-gel composite thick films. The sol-gel composite solution chemistry and processing conditions allow for the incorporation of combinations of inexpensive conductive particle materials commonly used for resistive heating applications.

Other applications for resistive and conductive sol-gel composite thick films include integrated heating elements in resistance heater applications such as kettles, hot plates, stove top elements, and hot runners for injection molding. Conductive sol-gel thick films may have more generic application as an electrode material on heated components.

The resistive coating of the present invention may in some applications be applied directly to a substrate absent an electrically insulating layer interspersed therebetween. For example if the substrate itself were insulating, such as aluminum oxide or if the application is an electrode application it may not be necessary to set up an insulating barrier between the resistive material and substrate.

Phosphating maybe used to improve the oxidation resistance of carbon-based materials in the resistive films. A suitable phosphate, such as aluminum phosphate, maybe deposited on the resistive coating after initial heat processing of the resistive coating. The phosphate coats the individual particulars and reduces the amount of oxidation that would normally occur. The coatings which benefit most from phosphating are graphite and any of the carbides.

Alternatively, the resistive film may be coated with a layer of straight sol-gel. In other words, the sol-gel solution without powder additives. Such a coating may be used on a variety of materials including graphite, carbides and nitrides. The effect is similar to that of phosphating in that it provides an oxidation barrier.

The phosphate system may be heat treated from 300 to 500° C. The sol-gel oxidation barrier coatings would be processed at 350° C. and higher.

Other applications which are potential candidates for resistive coatings include other white goods such as ovens, buffet warmers/heaters, clothes dryers, food warmers, water heaters and coffee makers. The coating may find application in small appliances such as space heaters, kettles, coffee makers, toasters/ovens, hair dryers and floor heaters. Potential automotive applications include heaters, defrosters and seat warmers. Industrial applications may include reactor heaters and pipe heaters/warmers.

EXAMPLE 1

15 g of 10 µm graphite flake, 15 g of 2.7 µm alumina powder and 1 g of sodium stearate were mixed with 125 g of alumina sol-gel prepared by a method similar to that of Yoldas[1]. This sol-gel composite resistive film was spray-deposited on a LAS (Lithium Aluminosilicate) glass ceramic (such as used for cook tops) coated with 500 µm of insulative alumina-silica sol-gel composite. The resistive coating was processed to 400° C. and the sheet resistance of the film was 30 Ohms/square. A layer of aluminum phosphate was deposited onto the resistive film and then fired to 400° C. to provide increased oxidation protection.

Dupont silver bus bars were deposited on each side of the thick sol gel resistive film and were processed to form a heating element. The heating element was operated at between 500–1800 W and used to boil a liter of cold tap water in less than 2 minutes.

EXAMPLE 2

16 g of 10 µm graphite flake, 15 g of 2.7 µm alumina powder and 1 g of sodium stearate were mixed with 125 g of alumina sol-gel. This sol-gel composite resistive film was spray-deposited on a LAS (Lithium Aluminosilicate) glass ceramic coated with 500 µm of insulative alumina-silica sol-gel composite. The resistive coating was processed to 400° C. and the sheet resistance of the film was 20–22 Ohms/square. A layer of aluminum phosphate was deposited onto the resistive film and then fired to 400° C. to provide increased oxidation protection.

The sample was placed in a furnace at 300° C. for 50 days, after which the resistance was 22–24 Ohms/square.

Another sample made according to this formulation with a 6 cm by 9 cm resistive square was coated with Dupont 7713 silver bus bars resulting in a bus to bus resistance of 29 Ohms. This element was cycled electrically at 120 V to 300° C. (45 minutes on and 15 minutes off) for 15 days after which the bus to bus resistance was 29 Ohms.

EXAMPLE 3

Using the formulation of example 2, a sol-gel composite resistive film was spray-deposited on 1/16" thick 304 series steel coated with 200 µm of insulative alumina-silica sol-gel composite. The measured screen resistance of 1 mil thick film was 20 Ohms/square. This element was fixed in a kettle casing and operated at 2.9 kW and used to boil 1 L of cold tap water in 1 minute and 55 secs.

EXAMPLE 4

Using the formulation from example 2, a sol-gel composite resistive film was spray-deposited on 0.080" thick aluminum coated with 150 µm of insulative alumina-silica sol-gel composite. The measured screen resistance of the 1 mil thick film was 28 Ohms/square.

EXAMPLE 5

25 g of 20 µm graphite flake and 85 g of a silica sol gel were mixed. This formulation was spray deposited onto mica to produce a 1 mil thick resistive film with a resistance of 35 Ohms/square.

EXAMPLE 6

A sol gel resistive formulation of 15 g boron-coated graphite (−325 Mesh), 15 g of 2.7 µm alumina powder and 1 g of methyl cellulose were mixed with 125 g of alumina sol-gel. This sol-gel composite resistive film was screen-printed (110 Mesh) on a LAS (Lithium Aluminosilicate) glass ceramic coated with 500 µm of insulative alumina-silica sol-gel composite. The resistive coating was processed to 400° C. and the sheet resistance of the 1 mil thick film was 58 Ohms/square.

EXAMPLE 7

A sol gel conductive formulation of 155 g silver powder (1–5 µm particle size), and 1.9 g of cellulose ether were mixed with 100 g of alumina sol gel. This composite conductive film was screen printed on LAS (Lithium Aluminosilicate) glass ceramic coated with 500 µm of insulative alumina-silica sol-gel composite, to produce a 1 mil thick coating. The coating was processed to 400° C. and after firing had a resistance of 0.4 Ohms/square.

EXAMPLE 8

Using the formulation from example 6, a 6"×9" sol-gel composite resistive film was screen printed on LAS (Lithium Aluminosilicate) glass ceramic coated with 500 µm of insulative alumina-silica sol gel composite. The silver formulation described in Example 7 above was used to deposit silver bus bars on each side of this resistive film resulting in a bus to bus resistance of 40 Ohms. This element was cycled electrically at 120 V to 300° C. (45 minutes on and 15 minutes off) for 4 days after which the bus to bus resistance was 40 Ohms.

EXAMPLE 9

55 g of 0.3 µm antimony-doped tin oxide and 100 g of an alumina sol gel were mixed. This formulation was spray-deposited on 1/16" thick 304 series steel coated with 200 µm of insulative alumina-silica sol-gel composite. The measured screen resistance of the 1 mil thick film was 189–204 Ohms/square. The sample was placed in a furnace at 300° C. for 50 days, after which the resistance was 189–204 Ohms/square.

EXAMPLE 10

25 g of Nickel powder (1–5 micron) and 100 g of alumina were mixed. This sol-gel composite resistive film was spray-deposited on 1/16" thick 304 series steel coated with 200 µm of insulative alumina-silica sol-gel composite. The resistive coating was processed to 400° C. and the sheet resistance of the 1 mil thick film was 2 Ohms/square.

EXAMPLE 11

160 g of 1 µm tungsten carbide and 100 g of alumina sol gel were mixed. This sol-gel composite resistive film was spray-deposited on 1/16" thick 304 series steel coated with 200 µm of insulative alumina-silica sol-gel composite. The resistive coating was processed to 400° C. and the sheet resistance of the 1 mil thick film was 28 Ohms/square.

EXAMPLE 12

12 g of 10 µm graphite flake, 18 g of 2.7 µm alumina powder, 2 g of sodium stearate and 125 g of an alumina sol gel were mixed. This formulation was spray-coated on to a hollow SS tube which was 4" in diameter and 12" long coated with 250 µm of insulative alumina-silica sol gel composite. Dupont 7713 silver bus bars were deposited on each end of the tube. The resulting bus to bus resistance was 27 Ohms.

The above description is intended in an illustrative rather than a restrictive sense. Variations to the materials, processing techniques and applications may be apparent to persons skilled in the relevant art without departing from the spirit and scope of the invention as defined by the claims set out below.

We claim:

1. A coating composition for a heating device comprising:

a sol-gel solution in which up to about 90% of said solution is graphite or a conductive metal powder in a uniform stable dispersion;

said graphite or conductive metal powder has a particle size in the range of 1 to 100 microns; and wherein said composition upon firing yields an electrically conductive coating for a heating device.

2. A composition as claimed in claim 1 wherein:

said graphite or conductive metal powder includes at least one of a molybdenum, tungsten, tantalum, nickel, chromium, silver, silver alloy, iron-nickel-chromium alloy, nickel chromium alloy and iron-chromium-aluminum alloy.

3. A composition as claimed in claim 2 wherein:

said conductive metal powder has a particle size of from 1 to 20 microns.

4. A composition as claimed in claim 1 wherein:

said sol-gel solution consists of cellulose ether mixed with alumina sol-gel; and said conductive powder is silver.

5. A composition as claimed in claim 4 wherein:

said silver powder has a particle size of from 1 to 5 microns; and said silver powder, cellulose ether and alumina sol-gel are present in the proportions of 155 grams of silver powder to 1.9 grams of cellulose ether to 100 grams of alumina sol-gel.

* * * * *